United States Patent
Temel et al.

(10) Patent No.: US 10,844,155 B2
(45) Date of Patent: Nov. 24, 2020

(54) FLOW MODIFIERS FOR COATING COMPOSITIONS

(71) Applicant: Allnex Austria GmbH, Werndorf (AT)

(72) Inventors: Armin Temel, Graz (AT); Thomas Schonbacher, Kalsdorf (AT); Markus Schafheutle, Graz (AT)

(73) Assignee: ALLNEX AUSTRIA GmbH, Werndorf (AT)

( * ) Notice: Subject to any disclaimer, the term of this patent is extended or adjusted under 35 U.S.C. 154(b) by 0 days.

(21) Appl. No.: 15/525,617

(22) PCT Filed: Dec. 8, 2015

(86) PCT No.: PCT/EP2015/078961
§ 371 (c)(1),
(2) Date: May 10, 2017

(87) PCT Pub. No.: WO2016/096537
PCT Pub. Date: Jun. 23, 2016

(65) Prior Publication Data
US 2017/0320991 A1     Nov. 9, 2017

(30) Foreign Application Priority Data

Dec. 16, 2014 (EP) .................................. 14198379

(51) Int. Cl.
| | | |
|---|---|---|
| *C08F 290/06* | (2006.01) | |
| *C08F 220/18* | (2006.01) | |
| *C09D 133/06* | (2006.01) | |
| *C09D 183/10* | (2006.01) | |
| *C09D 7/47* | (2018.01) | |
| *C09D 133/00* | (2006.01) | |
| *C08G 77/20* | (2006.01) | |
| *C08G 77/442* | (2006.01) | |

(52) U.S. Cl.
CPC ........ *C08F 290/068* (2013.01); *C08F 220/18* (2013.01); *C09D 7/47* (2018.01); *C09D 133/00* (2013.01); *C09D 133/06* (2013.01); *C09D 183/10* (2013.01); *C08F 220/1804* (2020.02); *C08F 220/1808* (2020.02); *C08G 77/20* (2013.01); *C08G 77/442* (2013.01)

(58) Field of Classification Search
None
See application file for complete search history.

(56) References Cited

U.S. PATENT DOCUMENTS

| | | | | |
|---|---|---|---|---|
| 4,564,557 A * | 1/1986 | Ohgushi | ............. | C08F 283/124 427/388.2 |
| 5,621,059 A | 4/1997 | Dupont et al. | | |
| 5,735,944 A | 4/1998 | Haubennestel et al. | | |
| 6,153,705 A | 11/2000 | Corpart et al. | | |
| 6,197,883 B1 | 3/2001 | Schimmel et al. | | |
| 6,630,522 B2 * | 10/2003 | Kawase | ............... | C08F 220/18 523/161 |
| 6,710,127 B2 * | 3/2004 | Haubennestel | ....... | C08F 283/12 524/379 |
| 8,227,086 B2 * | 7/2012 | Zhao | .................. | B01D 19/0409 428/447 |
| 8,637,613 B2 * | 1/2014 | Hashemzadeh | ....... | C08F 283/12 524/755 |
| 2004/0054071 A1 * | 3/2004 | Gobelt | ................ | C08F 293/005 524/588 |
| 2005/0123781 A1 * | 6/2005 | Drescher | ............. | C09D 133/14 428/522 |
| 2009/0186979 A1 | 7/2009 | Engelbrecht et al. | | |
| 2010/0015441 A1 * | 1/2010 | Zhao | .................... | C10M 155/02 428/355 AC |

FOREIGN PATENT DOCUMENTS

| | | | |
|---|---|---|---|
| DE | 19522475 | 9/1996 | |
| EP | 0159894 | 10/1985 | |
| EP | 0159894 A2 * | 10/1985 | .......... C08F 283/124 |
| EP | 1375605 | 6/2003 | |
| WO | 1996/030421 | 10/1996 | |
| WO | 1998/001478 | 1/1998 | |
| WO | 1998/058974 | 12/1998 | |
| WO | 1999/031144 | 6/1999 | |
| WO | 2006/125731 | 11/2006 | |
| WO | 2011/133408 | 10/2011 | |

OTHER PUBLICATIONS

International Search Report dated Jan. 13, 2016 in International Application No. PCT/EP2015/078961.

* cited by examiner

*Primary Examiner* — Satya B Sastri
(74) *Attorney, Agent, or Firm* — Wenderoth, Lind & Ponack, L.L.P.

(57) ABSTRACT

This invention relates to copolymers AB having moieties derived from vinyl-terminated polysiloxanes A with more than one vinyl group bound to the polysiloxane, and moieties derived from two or more alkyl esters B of an olefinically unsaturated carboxylic acid, wherein at least two different alkyl esters B1 and B2 are used; the alkyl group of the first alkyl ester B1 of an olefinically unsaturated carboxylic acid has from one to five carbon atoms, the alkyl group of the second alkyl ester B2 of an olefinically unsaturated carboxylic acid has from six to thirty carbon atoms, and moieties derived from at least one hydroxyalkyl ester B3 of an olefinically unsaturated carboxylic acid, the ester B3 having at least one hydroxyl group in the alkyl group, and from two to six carbon atoms in the alkyl group, to a process for their preparation, and to a method of use thereof as flow modifiers in coating compositions.

8 Claims, No Drawings

FLOW MODIFIERS FOR COATING COMPOSITIONS

FIELD OF THE INVENTION

The invention relates to flow modifiers for coating compositions. The invention further relates to coating compositions which comprise the flow modifiers as levelling agents. The coating compositions may preferably be solutions or dispersions of binders in organic solvents, in water, or in mixtures of organic solvents and water, and, where appropriate, may also comprise pigments and auxiliaries.

BACKGROUND OF THE INVENTION

Paint surfaces are usually not entirely smooth, but show a surface having an Irregular structure often referred to as waviness or as "orange peel". Fine structures are commonly referred to as "short wave", and coarse structures are called "long wave". Such structures are usually not desirable. The structure depends on the nature and composition of the coating compositions, and on the presence of solvents which are often expressly added as so-called "coalescing agents", as well as on other parameters such as temperature and speed of drying. Particularly in the case of powder coating materials, addition of flow modifiers, also referred to as flow enhancers, is necessary to achieve a smooth surface.

Both polymers based on (meth)acrylic monomers, and polymers based on polysiloxanes have been used as flow modifiers, flow enhancers, or levelling promoters, for coating compositions.

The polysiloxanes are generally polydimethylsiloxanes, polymethylalkylsiloxanes which may be polyether-modified or polyester-modified. Block copolymers comprising polysiloxane moieties have been described in EP 1 375 605 B1.

In the case of the poly(meth)acrylates, it is preferred to use polymers or copolymers of acrylic acid alkyl esters having an alkyl radical chain length of from one carbon atom in the alkyl chain up to thirteen carbon atoms in the alkyl chain, such as methyl acrylate, ethyl acrylate, n-butyl acrylate, n-hexyl acrylate, 2-ethylhexyl acrylate, lauryl acrylate, and tridecyl acrylate, or the corresponding methacrylates, or mixtures of any of these. Both acrylates and methacrylates shall be encompassed, for the purpose of this application, by the written form "(meth)acrylates". The products used possess in some cases a number average molar mass of up to 100 kg/mol. Acrylate copolymers made from alkyl acrylates having one or two carbon atoms in the alkyl group, and from acrylic acid, and optionally, from longer chain alkyl acrylates such as 2-ethylhexyl acrylate have been known from U.S. Pat. No. 5,621,059 A. These can be used as flow modifiers in water-borne and solvent-borne coatings, as well as in powder coatings. In the U.S. Pat. No. 6,197,883, the use of block copolymers as levelling promoters, levelling additives, or flow improvers has been described. All these different words describe different aspects of an additive that modifies the flow behaviour including shear and elongational viscosity, interfacial adhesion, and also surface tension, of a paint composition or coating composition whereto it has been added; therefore these additives are hereinafter generally referred to as "flow modifiers".

These poly(meth)acrylate (co)polymers used as flow modifiers may be employed as such or as solutions in organic solvents, or else as powders applied to silica, for example. The latter is normally the case when flow modifiers are used in powder coating materials. In coating formulations, the mass fraction of such products that are used as flow modifiers, in the mass of the coating formulation is usually from 0.05% to 3%.

The effect of these flow modifiers is presumably also based on their effect on the liquid-gas interface, where these products are accumulated owing to a certain incompatibility with the binder of the coating system. This incompatibility may be increased by raising the molar mass of these polymers, or change of their chemical composition. However, this can also lead to clouding of the coating, formation of surface irregularities such as craters in the coating film, or impaired interface adhesion in multi-layer coatings. This tendency is frequently observed in the case of polysiloxane-based flow modifiers.

Optimisation is therefore needed between the needed modification of surface tension and flow properties to obtain the desired smooth surface and the acceptable degree of incompatibility that does not yet lead to undesired surface irregularities. Our studies have verified that the existing polymers provide only inadequate solutions to the problem outline hereinbefore, and indicated that there is a need for improved additives which promote both levelling, even flow, and substrate wetting and which allow smooth coating films to be produced. It is also desired to produce such additives by conventional polymerisation processes, as the RAFT (Reversible Addition-Fragmentation chain Transfer) polymerisation technology which has been used in this context, as described in EP 1 375 605 B1, to produce polymers of low polydispersity has disadvantages, because a particular RAFT agent is only suitable for a limited set of monomers and the synthesis of a RAFT agent typically requires a multistep synthetic procedure and subsequent purification. RAFT agents also tend to be unstable over long time periods, are often highly coloured and can have a pungent odour due to gradual decomposition of the dithioester moiety to yield smaller molecule sulfur compounds having higher vapour pressure. The presence of sulfur and colour in the resulting polymer is also undesirable for some applications, and separation of these undesirable compounds involves additional steps.

In EP 0 159894 A2, a thermoset acrylic resin composition is disclosed for coating metallic materials, obtained by subjecting to radical copolymerisation, a mixture of the following monomers: (a) at least one acrylic acid ester or methacrylic acid ester having 1 to 12 carbon atoms in the ester group moiety, in a mass fraction of from 40% to 80% in the monomer mixture, (b) at least one hydroxyl group- or epoxy group-containing acrylic acid ester or hydroxyl group- or epoxy group-containing methacrylic acid ester, in a mass fraction of from 20% to 5% in the monomer mixture, (c) a vinyl group-containing polysiloxane, in a mass fraction of from 20% to 0.01% in the monomer mixture, and (d) a vinyl group-containing silane compound, in a mass fraction of from 20% to 2% in the monomer mixture. There is no mention of the mandatory presence of two different (meth)acrylic acid alkyl esters having from one to five carbon atoms in the alkyl groups of the first (meth)acrylic acid alkyl ester, and from six to thirty carbon atoms in the alkyl groups of the second (meth)acrylic acid alkyl ester.

In WO 2006/125731 A1, a slip- and levelling agent is described that comprises a copolymer which is obtained by copolymerising (A) at least one unit of a mono- or di perfluoroester of an unsaturated dicarboxylic acid; (B) at least one terminal reactive polysiloxane unit; (C) at least one alkyl(meth)acrylate unit or cycloalkyl(meth)acrylate unit and/or (meth)acrylic acid and/or other units originating from vinylic compounds that can form radicals. There is no disclosure of the mandatory presence of hydroxyalkyl (meth)acrylates in the monomer mixture, nor is there mention of a divinyl terminated polysiloxane unit.

In US 2004/054071 A1, the use of block copolymers as levelling agents for surface coatings is described, which copolymers have a mass average molar mass of from 1 kg/mol to 100 kg/mol. The levelling agent is a linear or branched block copolymer composed of a polysiloxane block and one or more blocks prepared from ethylenically unsaturated monomers by controlled free-radical addition polymerisation. While copolymers are disclosed that comprise units derived from the monomers butylacrylate and lauryl acrylate, there is no mention of divinyl polysiloxanes, nor of hydroxyalkyl (meth)acrylates.

In WO 2011/133408 A2, a silicone-acrylic copolymer is described which comprises a covalently bonded silicone polymer with an acrylic polymer through the —Si—O—Si— linkage. This silicone-acrylic copolymer is a reaction product of (a) a silicone polymer, (bi) a mixture of acrylic monomers wherein at least one acrylic monomer comprises a silane (meth)acrylic monomer and/or a siloxane (meth)acrylic macromer with a radical initiator to form an acrylic prepolymer or (bii) an acrylic polymer which comprises a silane or a siloxane functional group; and (c) a so-called "scrambling catalyst", wherein the ratio of the silicone polymer (a) and the mixture of acrylic monomers (bi) or polymer (bii) is from 50:1 to 1:50. This silicone-acrylic copolymer is useful as an adhesive, sealant, coating, and the like. There is no disclosure of the mandatory simultaneous presence of both $C_1$- to $C_5$-alkyl (meth)acrylates and $C_6$- to $C_{30}$-alkyl (meth)acrylates, and also, of hydroxyalkyl (meth)acrylates.

It has been found in the experiments underlying the present invention that these objectives mentioned supra can be fulfilled by copolymers made from monomers having a polysiloxane moiety and more than one, preferably two, copolymerisable vinyl groups and further vinyl monomers comprising two or more alkyl esters of an olefinically unsaturated carboxylic acid and at least one hydroxyalkyl ester of an olefinically unsaturated carboxylic acid.

SUMMARY OF THE INVENTION

The invention accordingly provides copolymers AB comprising moieties derived from
vinyl-terminated polysiloxanes A with more than one vinyl group bound to the polysiloxane, and
moieties derived from two or more alkyl esters B of an olefinically unsaturated carboxylic acid, wherein at least two different alkyl esters are used, the first being referred to as alkyl ester B1, and the second being referred to as alkyl ester B2; wherein the alkyl group of the first alkyl ester B1 of an olefinically unsaturated carboxylic acid has from one to five carbon atoms, and wherein the alkyl group of the second alkyl ester B2 of an olefinically unsaturated carboxylic acid has from six to thirty carbon atoms, and
moieties derived from at least one hydroxyalkyl ester B3 of an olefinically unsaturated carboxylic acid, the ester B3 having at least one hydroxyl group in the alkyl group, and from two to six carbon atoms in the alkyl group.

The invention further provides a process to make these copolymers AB by a radically initiated polymerisation reaction, preferably in an inert solvent, and still further, a method of use of the copolymers AB as defined hereinabove as flow modifier for coating compositions. Finally, the invention is also directed to coating compositions comprising the copolymers AB as defined hereinabove.

DETAILED DESCRIPTION OF THE PREFERRED EMBODIMENTS

The vinyl-terminated polysiloxanes A with at least one vinyl group bound to the polysiloxane preferably have two terminal vinyl groups, and further preferably, obey the formula I Formula I

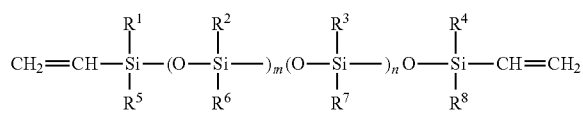

where $R^1$ through $R^8$ are selected, independently from each other, from the group consisting of alkyl groups having from one to eight carbon atoms, aryl groups selected from the group consisting of phenyl and alkylphenyl, the latter having from one to nine carbon atoms in the alkyl group, haloalkyl groups having from one to six carbon atoms where at least one of the hydrogen atoms of the alkyl groups is replaced by a halogen atom selected from the group consisting of F and Cl. $R^1$, $R^4$, $R^5$ and $R^8$ are preferably methyl, $R^2$ and $R^6$ are preferably both methyl, and $R^3$ and $R^7$ are preferably both ethyl or phenyl, or in another preferred embodiment they are different, and $R^3$ is methyl while $R^7$ is 1,1,1-trifluoroprop-3-yl. The numbers m and n are independently from each other, zero, or an integer number from 1 to 90, wherein the sum m+n of m and n must be at least 6, and not more than 100. In a preferred embodiment, m+n is at least 9, and not more than 90. In a further preferred embodiment, m+n is at least 9, and not more than 85. It is also preferred that n is less than m, and more preferred, n=0.

When using a polysiloxane which has only methyl groups as groups $R^1$ to $R^8$, as polysiloxane A, it is particularly preferred to use a value for m so that the number average molar mass of the divinylpolysiloxane A is from 500 g/mol to 7000 g/mol.

In the alkyl esters B1, the alkyl group has from one to five carbon atoms, and can be selected from the group consisting of methyl, ethyl, n-propyl, iso-propyl, n-butyl, iso-butyl, sec-butyl, tert-butyl, n-pentyl, sec-pentyl, and tert-pentyl. The olefinically unsaturated carboxylic acid is preferably acrylic or methacrylic acid. Particularly preferred alkyl esters B1 are ethyl acrylate and n-butylacrylate, especially preferred is ethyl acrylate.

In the alkyl esters B2, the alkyl group has from six to thirty carbon atoms, and can be selected from the group consisting of n-hexyl, n-heptyl, n-octyl, 2-ethylhexyl, n-nonyl, 2-nonyl, dodecyl, tridecyl, pentadecyl, and octadecyl, including linear and branched isomers in those cases where these have not been expressly disclosed. The olefinically unsaturated carboxylic acid is preferably acrylic or methacrylic acid. Particularly preferred alkyl esters B2 are hexylacrylate and 2-ethyl-hexylacrylate, especially preferred is 2-ethylhexylacrylate.

Preferred hydroxyalkyl esters B3 have at least one hydroxyl group in the alkyl group, and from two to six carbon atoms in the alkyl group. The olefinically unsaturated carboxylic acid is preferably acrylic or methacrylic acid. Particularly preferred are hydroxyethyl (meth)-acrylate, hydroxypropyl (meth)acrylate including the 3-hydroxypropyl ester, and the isomer mixture of 2-hydroxy-1-propyl (meth)acrylate and 1-hydroxy-2-propyl(meth)acrylate. Most preferred alkyl esters B3 are hydroxyethyl acrylate and the isomer mixture of 2-hydroxy-1-propylacrylate and 1-hydroxy-2-propylacrylate.

Preferred copolymers AB according to this invention comprise the following mass fractions w of repeating units derived from the monomers:

for divinyl-terminated polysiloxanes A, w(A) is from 0.5% to 4.5%, particularly preferably, from 1.0% to 4.2%, and especially preferred, from 1.5% to 3.8%;

for alkyl esters B1 of an olefinically unsaturated carboxylic acid wherein the alkyl group has from one to five carbon atoms, w(B1) is from 30% to 85%, particularly preferably, from 35% to 80%, and especially preferred, from 40% to 75%;

for alkyl esters B2 of an olefinically unsaturated carboxylic acid wherein the alkyl group has from six to thirty carbon atoms, w(B2) is from 5% to 55%, particularly preferably, from 6% to 50%, and especially preferred, from 7% to 45%;

for hydroxyalkyl esters B3 of an olefinically unsaturated carboxylic acid wherein the alkyl group has from two to six carbon atoms, w(B3) is from 5% to 20%, particularly preferably, from 7.5% to 18%, and especially preferred, from 10% to 16%.

All ranges for the different monomers stated here may be combined, paying attention not to exceed 100% for the sum of mass fractions.

Mass fractions of repeating units in the polymers are calculated by identifying the repeating unit of an olefinically unsaturated monomer —$CX^{i1}X^{i2}$—$CX^{i3}X^{i4}$— for each olefinically unsaturated monomer i having the general formula $CX^{i1}X^{i2}=CX^{i3}X^{i4}$, and measuring the average number of these repeating units in the polymer molecules by an appropriate analytical means, in this case preferably by $^{13}$C-NMR spectroscopy, and multiplying the number fractions thus obtained by the molar mass of the repeating units which are the same as these of the monomers. When using an analytical tool such as pyrolysis gas chromatography where the signal is mass dependent, mass fractions can be directly calculated from the analytical results after calibration with the pure monomers or copolymers of known composition.

Combinations of the preferred embodiments for the individual components mentioned herein supra have been found to lead to particularly good results. The best results have been obtained if a particularly preferred choice for component A has been combined with preferred choices, or particularly preferred choices for one or for more of components B1. B2, and B3.

The addition polymerisation processes which are used and can be used to prepare the copolymers AB of the invention are as follows:

(1) standard radical polymerisation in solution, where the radicals are generated by thermal decomposition preferably of azo compounds, persulfates, or peroxides, by photolysis preferably of metal iodides, metal alkyls, or azo compounds, by ionising radiation, by electrolytical formation of radical anions or radical cations, by redox reactions preferably of hydrogen peroxide or alkyl hydrogen peroxides under iron catalysis, or using ternary initiators such as those based on a metallocene, an initiator such as an acylperoxide, and a diketocarboxylic acid;

(2) controlled radical polymerisation methods which include (2 a) controlled free-radical polymerisation with xanthogenic esters as transfer agents, as described for example in WO 1998/058974 A1, (2 b) controlled free-radical polymerisation with dithioesters as transfer agents, as described for example in WO 1998/001478 A1, (2 c) controlled free-radical polymerisation with dithiocarbamates as transfer agents, as described for example in WO 1999/031 144 A1, (2 d) atom transfer radical polymerisation (ATRP), using transition metal catalysts, as described for example in WO 1996/030421 A1 or in Chem. Rev. 2001, 101, 2921.

Polymerisation processes (2 a) and (2 c) are also referred to as RAFT polymerisations.

An advantage of the monomers and the composition of the copolymers AB used for the flow modifiers in the present invention is that a conventional solution polymerisation using azo or peroxide or peroxy ester initiators can be used to make these copolymers in the desired specifications, which avoids the presence of the sulfur-containing or colour-generating components of the initiators used in the processes according to (2).

Polymerisation has been made by charging a solution of the vinyl-terminated polysiloxane A in an alcohol solvent, preferably isopropanol, and heating the solution to a temperature between 55° C. and 120° C., preferably under reflux. Two mixtures were added at the same time, one comprising the radical initiator in the same alcohol solvent, and the other comprising a mixture of the monomers B1, B2, and B3, optionally dissolved in the same alcohol solvent. When the reaction is complete, which is checked by determining the concentration of unreacted monomers in the reaction mixture, the reaction mixture is heated to a temperature of between 130° C. and 170° C., and solvent, unreacted monomers and by-products of the decomposition of the radical initiator are removed by distillation under reduced pressure. The copolymer AB can be used as such, or can be purified by solution-precipitation steps, by extraction, or by chromatographic methods as usual.

The number average molar mass $M_n$ of the copolymers AB of the invention used as flow modifiers is preferably in the range of from 1.5 kg/mol to 6.5 kg/mol, and the mass average molar mass $M_w$ is preferably in the range of from 2.5 kg/mol to 40 kg/mol, measured via gel permeation chromatography, using tetrahydrofuran as solvent, and calibrated with poly-styrene standards. It has to be noted that the values stated for the molar masses of the copolymers are only the equivalent polystyrene molar masses, and do not reflect the actual value for the examined copolymers.

The copolymers AB according to this invention are used as flow modifiers in coating formulations comprising binder resin, solvents, additives, pigments and colourants etc., including crosslinkers and catalysts if appropriate, in relatively small amounts, corresponding to a mass fraction of flow modifier copolymer in the coating composition, of from 0.05% to 5%, preferably from 0.1% to 3%, and most preferably from 0.2% to 2%.

The flow modifiers of the invention can be used as solutions, as aqueous emulsions, or in bulk, i. e. undiluted form, depending on the nature of the coating material and the manner of its application.

In solvent-borne coating materials it is preferred to use flow modifiers whose solvents are similar to those of the coating materials themselves. In radiation-curing systems the flow modifiers are dissolved preferably in corresponding monomers. In powder coating materials preference is given to an undiluted form of the flow modifier, in the form of a master batch, or to a form thereof which is applied to a pulverulent carrier material. These flow modifiers can also be incorporated, as described in German Patent Application DE-A 195 22 475, into wax melts and so converted into free-flowing solid forms. In aqueous powder slurries, the flow modifiers can be added in the form of an aqueous emulsion. These emulsions are prepared in accordance with the prior art with the aid of emulsifiers.

The invention also relates to coating compositions which comprise the flow modifier in a mass fraction, based on the mass of the coating composition, of from 0.05% to 5%, preferably from 0.1% to 3%, and most preferably from 0.2% to 2%.

The invention is further illustrated by the following examples.

Gloss was measured using a micro-TRI-gloss instrument obtained from BYK Gardner GmbH, in accordance with DIN EN ISO 2813.

Measurement of wave scan and DOI was made with a wave scan dual instrument obtained from BYK Gardner GmbH, in accordance with ASTM E430.

Example 1 Polymerisation of Silicone/Acrylic Hybrid Copolymers

The polymers were synthesised following always the same procedure described hereunder. The composition of the polymers was varied according to table 1 below.

A glass reactor having a volume of 500 ml equipped with reflux condenser, stirrer, and two addition funnels was charged with 75 g of isopropanol and the mass of divinyl-poly-dimethylsiloxane indicated in Table 1. The contents were heated to reflux (83° C.), and a mixture of t-amyl per-2-ethylhexanoate in isopropanol as well as a mixture of the monomers ethylacrylate, 2-ethylhexylacrylate and hydroxyethylacrylate were gradually added over five hours. Reaction was then brought to completion by keeping the mixture at 83° C. for one more hour, and finally, residual monomers, solvent and by-products from the decomposition of the radical initiator were removed by distillation under reduced pressure at 160° C.

were completed with additions of flow modifiers as follows, for
part (a) of CC0 (unmodified): no addition
part (a) of CC1: 0.65 g of copolymer P1 of example 1,
part (a) of CC2: 0.65 g of copolymer P2 of example 1,
part (a) of CC3: 0.65 g of copolymer P3 of example 1,
part (a) of CC4: 0.65 g of copolymer P4 of example 1,
part (a) of CC5: 0.65 g of copolymer P5 of example 1,
part (a) of CC6: 0.65 g of copolymer P6 of example 1,
part (a) of CCR (reference): 0.17 g of a commercial levelling additive based on a polyether modified polysiloxane (Additol® VXL 4930, Allnex Austria GmbH), 0.11 g of a commercial acrylic copolymer levelling additive having a hydroxyl value of 40 mg/g (Modaflow® 9200, Allnex Austria GmbH),
with final addition of 1.48 g of a solution of dibutyltin dilaurate in xylene with a mass fraction of the tin salt of 1% (Metatin® 712, The DOW Chemical Company), and 0.1 g of diethyl ethanolamine to each of the portions (a).

For the crosslinker composition used therefor (part (b)), eight mixtures were prepared, each from 28.18 g of a hexamethylene diisocyanate trimer having a mass fraction of isocyanate groups of 22% (Desmodur® N 3300, Bayer Material Science), 10.75 g of butyl acetate, 2.69 g of an aromatic solvent comprising $C_7$ to $C_{10}$-aromatic compounds having a boiling range of from 150° C. to 180° C. (Solvent Naphtha H), and 0.1 g of xylene isomer mixture.

The compositions (a) and compositions (b) were mixed separately in a laboratory size blender at 6000 $min^{-1}$ for thirty minutes.

Example 3 Preparation of Test Panels

Cleaned steel panels have been wiped with isopropanol just before spray application. Then a standard solvent borne black auto refinish one-pack spray basecoat was been adjusted to an efflux time of 15 s (DIN-4 cup) by adding appropriate solvents, and applied to one half of the area of

TABLE 1

Monomer Composition for Copolymers P1 to P6

|  | P1 | P2 | P3 | P4 | P5 | P6 (comp. Example) |
|---|---|---|---|---|---|---|
| tert-amyl per(2-ethylhexanoate) | 4.3 g | 4.1 g | 4.5 g | 4.5 g | 3.5 g | 3.8 g |
| 2-ethylhexylacrylate | 7.3 g | 40.0 g | 8.5 g | 40.0 g | 9.5 g | 23.6 g |
| ethylacrylate | 70.0 g | 43.9 g | 70.0 g | 38.5 g | 70.0 g | 60.5 g |
| hydroxyethylacrylate | 15.0 g | 10.1 g | 15.0 g | 15.0 g | 15.0 g | 7.3 g |
| divinylpolydimethylsiloxane 1000 [1] | 3.4 g | 2.0 g | 2.0 g |  |  | 4.8 g |
| divinylpolydimethylsiloxane 4000 [2] |  |  |  |  | 2.0 g |  |
| divinylpolydimethylsiloxane 6000 [3] |  |  |  | 2.0 g |  |  |

Divinylpolydimethylsiloxanes used are according to Formula I, with a mass average molar mass of 1 kg/mol [1], 4 kg/mol [2] or 6 kg/mol [3]

Example 2 Two-Pack Clearcoat Coating Compositions

Two-pack clear-coat compositions have been made, where for part (a), for each of CC0 to CCR, 76.05 g of a solution of a high solids acrylic resin having a hydroxyl value of 140 mg/g in butylacetate, with a mass fraction of resin of 75%, was diluted with 6.73 g each of xylene, of methoxypropyl acetate, and of further butyl acetate, together with the following additives: 0.51 g of a hindered amine light stabiliser (Tinuvin® 292, BASF SE), 1.48 g of a benzotriazole light stabiliser (Tinuvin® 1130, BASF SE), each of the cleaned steel panels by spray application at 23° C. and 50% relative humidity. The panels were dried for twenty-four hours at 23° C. and 50% relative humidity. The resulting dry film thickness was approximately 10 μm.

The clearcoats CC0 to CC6 as well as the reference clearcoat CCR, all of example 2, were mixed by adding one portion each of component (b) to each of the different components (a) in the quantities as detailed in example 2, and the viscosity adjusted to 16 s (DIN-4 cup) by adding butyl acetate. The clearcoats CC0 to CCR then were applied to the entire area of the basecoat covered steel panels by an automatic spray system at 23° C. and 50% relative humidity achieving a constant dry film thickness of 45 μm. The coated panels were flashed off for thirty minutes and then placed into an oven for 30 minutes at 80° C. for forced drying and further stored at 23° C. and 50% relative humidity for five days.

Then a second layer of clearcoat was applied to the coated panels by casting at a wet film thickness of 150 µm. This second layer of clearcoat was similar to the first one with the exception that the solvents from component (b) have been left out of the formulation. After casting the panels were flashed off for thirty minutes at 23° C. and 50% relative humidity followed by a thirty minutes cure at 80° C. in an oven. Immediately after this cure the first set of cross-cut determination was performed. This test was repeated after one day and after eight days of storage at 23° C. and 50% relative humidity.

Example 4 Quality Test

The appearance (wavescan, DOI: Distinctness Of Image, gloss) of the clear-coat layer (CC) on the basecoat (BC) for all coated panels as well as the results from the cross-cuts (interlayer adhesion) are given in tables 2 and 3:

TABLE 2

Wavescan, DOI, Gloss

| Clear Coat | Wave Scan CC on BC | | | Gloss CC on BC | | |
|---|---|---|---|---|---|---|
| | Longwave | Shortwave | DOI | 20° | 60° | 85° |
| CC0 | 64.1 | 49.6 | 65.9 | 59.70 | 82.50 | 89.10 |
| CC1 | 9.1 | 1.3 | 96.5 | 88.30 | 93.50 | 99.00 |
| CC2 | 25.9 | 34.2 | 86.50 | 89.40 | 94.10 | 99.30 |
| CC3 | 8.3 | 4.1 | 96.60 | 87.50 | 92.90 | 99.20 |
| CC4 | 13.2 | 29.6 | 88.5 | 89.60 | 93.90 | 98.40 |
| CC5 | 26.0 | 10.0 | 95.7 | 88.40 | 93.80 | 99.30 |
| CC6 | 27.1 | 29.6 | 85.9 | 88.10 | 94.10 | 98.80 |
| CCR | 38.3 | 30.8 | 88.4 | 88.30 | 93.90 | 99.30 |

Longwave and shortwave are both rated on a scale from 0 (best) to 100 (worst), DOI is rated on a scale from 100 (best, like a perfect mirror) to 0 (worst, perfect diffusor). Gloss is also rated on a scale from 100 (best) to 0 (worst).

The best combination of values was obtained for clearcoats CC1 and CC3.

TABLE 3

Cross-cut, adhesion

| | BC/CC after 8 d | CC/CC after 8 d |
|---|---|---|
| CC0 | 0 | 0 |
| CC1 | 0 | 0 |
| CC2 | 0 | 1 |
| CC3 | 0 | 0 |
| CC4 | 0 | 1 |
| CC5 | 0 | 0 |
| CC6 | 0 | 5 |
| CCR | 0 | 1 |

This cross-cut test was performed in accordance with the ASTM D 3359, method A, where "5" means: more than 65% of the paint area removed, "4" means between 35% and 65% of the paint area is removed, and "0" means 0% of the area is removed by pulling off the adhesive tape.

Clearcoats CC1, CC3 and CC5 show the best results. It is essential that both a good result in the cross-cut test (meaning good interlayer adhesion), and surface quality (high gloss, low waviness) are realised with the same levelling additive. This has been realised with the copolymers AB of the present invention.

The invention claimed is:

1. A flow modifier for coating compositions which is a copolymer AB comprising moieties derived from
vinyl-terminated polysiloxanes A with more than one vinyl group bound to the polysiloxane, wherein the vinyl-terminated polysiloxanes A have two terminal vinyl groups, and obey the formula I

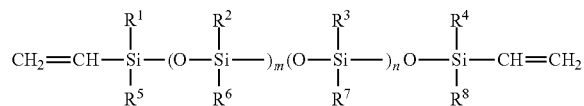

Formula I where $R^1$ through $R^8$ are selected, independently from each other, from the group consisting of alkyl groups having from one to eight carbon atoms, aryl groups selected from the group consisting of phenyl and alkylphenyl, the latter having from one to nine carbon atoms in the alkyl group, haloalkyl groups having from one to six carbon atoms where at least one of the hydrogen atoms of the alkyl groups is replaced by a halogen atom selected from the group consisting of F and Cl; and wherein the numbers m and n are independently from each other, zero, or an integer number from 1 to 90, wherein the sum (m+n) of m and n must be at least 6, and not more than 100, and
moieties derived from a first alkyl ester B1 which is ethyl acrylate, and a second alkyl ester B2 which is 2-ethylhexylacrylate, and
moieties derived from one hydroxyalkyl ester B3 which is hydroxyethylacrylate, wherein the copolymer AB comprises the following mass fractions w of repeating units derived from the monomers:
for divinyl-terminated polysiloxanes A, w(A) is from 1.5% to 4.5%;
for the ethyl acrylate B1, w(B1) is from 30% to 75%;
for the 2-ethylhexylacrylate B2, w(B2) is from 5% to 55%;
for the hydroxyethylacrylate B3, w(B3) is from 10% to 16%.

2. The flow modifier of claim 1 wherein, in the copolymer AB, the sum (m+n) of m and n must be at least 9, and not more than 90.

3. The flow modifier of claim 1, wherein, in the copolymer AB, $R^1$, $R^4$, $R^5$ and $R^8$ are methyl, $R^2$ and $R^6$ are both methyl, and $R^3$ and $R^7$ are both ethyl or phenyl, or they are different, and $R^3$ is methyl while $R^7$ is 1,1,1-trifluoroprop-3-yl.

4. The flow modifier of claim 1 wherein, in the copolymer AB, n=0.

5. The flow modifier of claim 4 wherein, in the copolymer AB, the value for m is chosen so that the number average molar mass of the divinylpolysiloxane A is from 500 g/mol to 7000 g/mol.

6. The flow modifier of claim 1 wherein the copolymer AB has, having a number average molar mass $M_n$ of from 1.5 kg/mol to 6 kg/mol, and a mass average molar mass $M_w$ of from 2.5 kg/mol to 40 kg/mol, where the numerical values are the polystyrene equivalents as measured by GPC.

7. A method of use of the flow modifier of claim 1 comprising adding the flow modifier of claim 1 to for coating composition comprising at least a binder resin, and optionally, one or more of solvents, additives, pigments, colourants, crosslinkers, and catalysts, wherein the flow modifier is present in the coating composition in a mass fraction of from 0.05% to 5%.

8. A coating compositions comprising the flow modifier of claim 1.

* * * * *